Oct. 18, 1932.  J. D. McCABE  1,882,668
FILLING DEVICE
Filed Aug. 13, 1930
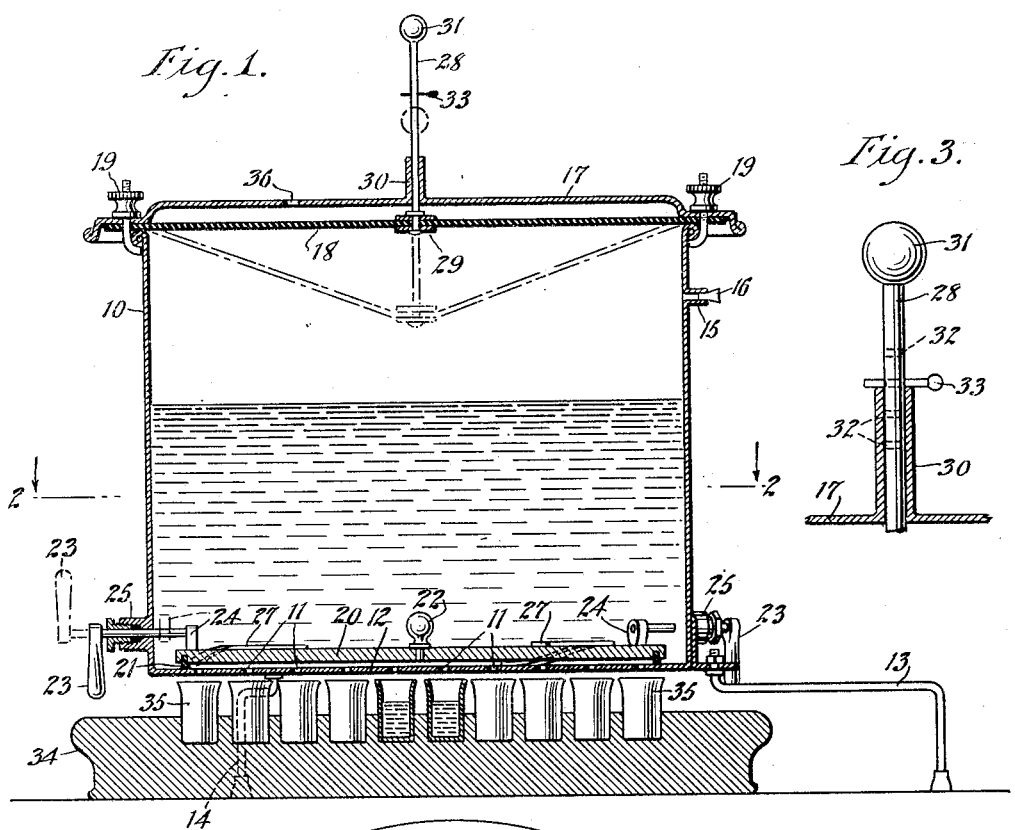
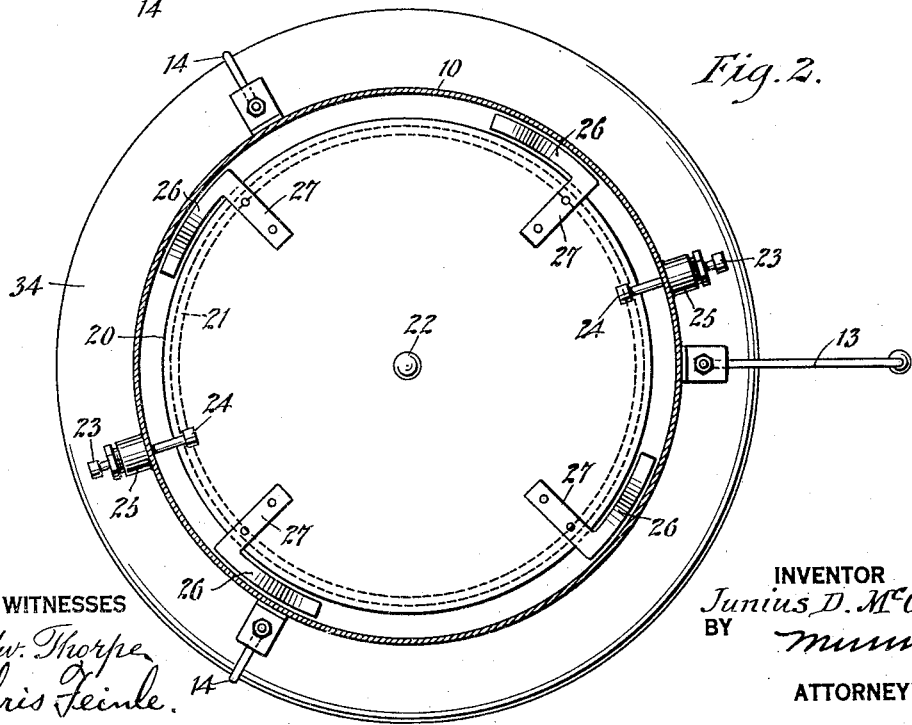
WITNESSES
Edw. Thorpe
Chris Feinle.
INVENTOR
Junius D. McCabe
BY
ATTORNEY Patented Oct. 18, 1932

1,882,668

UNITED STATES PATENT OFFICE

JUNIUS D. McCABE, OF CORAOPOLIS, PENNSYLVANIA

FILLING DEVICE

Application filed August 13, 1930. Serial No. 475,054.

This invention relates to a device for filling liquid in a multiplicity of vessels or cups simultaneously and which may be used advantageously for filling communion cups with sacramental liquid, and has especial reference to a device of the type disclosed in Letters Patent of the United States, No. 1,296,300, granted to me.

The invention has for its general object, the provision of a device of the indicated character, which will be of simple and improved construction, reliable in operation, capable of filling a large number of vessels or cups simultaneously in an expeditious manner, and which will be of substantial and efficient design.

The nature of the invention and its distinguishing features and advantages will appear when the following specification is read in connection with the accompanying drawing, in which Figure 1 is a vertical section of the device embodying the features of the invention shown in conjunction with a tray having cups in position to be filled;

Figure 2 is a section on the line 2—2 of Figure 1;

Figure 3 is a fragmentary view illustrating certain features of the device.

Referring now more particularly to the drawing, it will be apparent that the device includes a tank or reservoir 10, which may be of any preferred size and shape and which is cylindrical in the present instance, open at the top, and having a plurality of discharge apertures 11 in the bottom 12 thereof. The tank 10 is supported in elevated position on legs secured thereto near the bottom thereof, there being a long leg 13 and relatively short legs 14. The legs 13 and 14 are disposed radially and are spaced equidistantly. The tank 10 has a vent 15 in the side wall thereof near the top which is closed by a stopper 16. The open upper end of the tank 10 is closed by a lid 17, together with a rubber diaphragm 18, which are held in place by suitable clamping elements 19. Use is made of a seal plate or disk 20 having a rubber ring-shaped gasket 21 secured in the bottom thereof. The plate 20 is somewhat smaller in diameter than the internal diameter of the tank 10. The seal plate 20 has a knob 22 located centrally thereof for the purpose of placing it in the tank 10 and for removing the same therefrom. The gasket 21 is large enough in diameter to prevent the flow of liquid through the apertures 11 when the plate 20 is clamped down in place with the gasket 21 in contact with the bottom 12 of the tank, as shown in Figure 1.

In order to clamp the seal plate 20 in place and to release it, there is provided means at diametrically opposite points of the side wall of the tank 10 comprising a crank 23 having a cam 24 on the inner end thereof, the crank 23 being held in place for sliding and turning movement by a stuffing box 25 on the side wall of the tank. Each crank 23 may be slid to the position shown in dot and dash lines in Figure 1 in order that the seal plate 20 may be placed on the bottom 12 of the tank and also for the purpose of enabling the removal of the seal plate 20. Each crank 23 may be turned to cause its cam 24 to bear down on the upper surface of the seal plate 20, to press the gasket 21 in sealing contact with the bottom 12 of the tank 10.

In order to raise or elevate the seal plate 20 to allow liquid to flow from the tank 10 through the apertures 11, there is provided means in the form of flat springs 26, secured as at 27, to the seal plate 20. In the present instance there are provided four springs 26 arranged circumferentially of the seal plate 20 and spaced equidistantly, as shown most clearly in Figure 2.

In order to control the flow of liquid from the tank through the apertures 11 into the vessels or cups, so that each vessel or cup will have the same quantity of liquid therein, there is provided means presently to be described. A stem 28 is secured in any suitable manner, as at 29, to the diaphragm 18 centrally thereof, and this stem 28 extends upwardly through a gland 30 on the lid 17, and is of a length to project a suitable distance beyond the gland. The stem 28 has a knob 31 on the upper end thereof. The stem is provided with a plurality of transverse holes 32 therein, each of which is adapted to receive a pin 33. In the drawing there is shown a tray 34 which carries cups 35 each of which is arranged in a recess in the upper surface of the tray 34. The cups 35 are equal in number to the number of apertures 11 in the bottom 12 of the tank, and when the tray 34 is placed in contact with the legs 14, the cups 35 will be in registration with the apertures 11 directly below the same.

The operation of the device is as follows:
The tray with the cups 35 is put in place, registering the cups with the apertures 11. The seal plate 20 is then put in place on the bottom 12 of the tank, and is clamped in place by the cranks 23 which are manipulated to cause the cams 24 thereof to bear down on the plate 20. The desired quantity of liquid is then put into the tank 10. The lid 17 together with the rubber diaphragm 18 is clamped in place by the application of the clamping elements 19. The stopper 16 is then removed from the vent 15, after which pressure is applied to the knob 31 of the stem 28, causing the dam to assume the position shown in dot and dash lines in Figure 1. The air in the tank 10 above the liquid is partly exhausted through the vent 15. A vent 36 in the lid 17 permits air to enter the spaced between the lid 17 and the diaphragm 18. The stopper 16 is placed in the vent 15 to close the same. A partial vacuum now exists in the tank 10 above the liquid. The seal plate 20 is released by manipulating the cranks 23, which will be followed by the action of the springs 26 raising the plate 20, and the liquid will then be held in suspension, and will flow only through the apertures 11 into the cups 35 when the stem 28 is depressed. The amount of liquid to be filled in each of the cups 35 may be controlled by inserting the pin 33 in a particular one of the holes 32 in the stem 28. In this manner the cups 35 will be filled simultaneously, and each will receive the same amount of liquid.

What is claimed is:

1. A filling device comprising a liquid tank having discharge apertures in the bottom, a seal element for closing said apertures to prevent the discharge of liquid therefrom, means to releasably hold said element in aperture closing position, means to move said element to the aperture opening position when released, means including an elastic diaphragm for excluding air from the tank above the liquid therein, said diaphragm also being operable to force liquid from the tank through said apertures when said element is in the opened position, and means to vary the movement of the diaphragm to regulate the outflow of liquid from the tank through said apertures.

2. In a filling device, a liquid tank having discharge apertures in the bottom thereof, a seal element within the tank adapted for contactual engagement with said bottom to prevent the discharge of liquid from the tank through said apertures, means to releasably retain said element in the contactual engagement with said bottom, means to elevate said element from the bottom when released, so that liquid may flow from said tank through said apertures, and means to produce a partial vacuum within the tank above the liquid, and also to cause pressure on the liquid to force the desired quantity thereof from the tank through said apertures.

3. In a filling device, a liquid tank having discharge apertures, means to control the discharge of liquid through said apertures, a lid for the tank, an elastic diaphragm, means to secure the lid and diaphragm in place on the open top of the tank, said lid having a vent, said tank having a vent, means connected with the diaphragm and projecting through the lid to operate the diaphragm, and means which coacts with the means last mentioned to vary the amount of liquid discharged through said apertures.

4. In a filling machine, a liquid tank having discharge apertures in the bottom, a plate having a ring gasket fixed to the bottom thereof, clamping devices operable in conjunction with said plate to releasably clamp the plate in place over said apertures with the gasket in sealing contact with the bottom of the tank to prevent the outflow of liquid from the tank through said apertures, and means connected with said plate, and engageable with the bottom of the tank to elevate said plate to break the seal so that liquid may flow from the tank through said apertures.

JUNIUS D. McCABE.